United States Patent [19]

Kolakowski et al.

[11] 3,903,018

[45] Sept. 2, 1975

[54] NOVEL COCATALYST SYSTEM FOR TRIMERIZING POLYISOCYANATES

[75] Inventors: Richard A. Kolakowski, Northford; Harold E. Reymore, Jr., Wallingford; Adnan A. R. Sayigh, North Haven, all of Conn.

[73] Assignee: The Upjohn Company, Kalamazoo, Mich.

[22] Filed: Jan. 30, 1974

[21] Appl. No.: 437,779

[52] U.S. Cl.. 252/431 C; 260/2.5 AC; 260/2.5 AW
[51] Int. Cl. .................. C08f 47/10; C08g 22/44
[58] Field of Search ............. 252/431 C, 426; 260/2.5 AW, 2.5 AC

[56] References Cited
UNITED STATES PATENTS

| | | | |
|---|---|---|---|
| 3,299,137 | 1/1967 | Payne et al. | 252/431 C X |
| 3,342,757 | 9/1967 | Considine et al. | 252/431 C X |
| 3,476,933 | 11/1969 | Mendelsohn | 252/431 C X |
| 3,676,380 | 7/1972 | McLaughlin et al. | 252/426 X |
| 3,745,133 | 7/1973 | Comunale et al. | 252/426 X |
| 3,799,896 | 3/1974 | Moss | 252/426 X |

*Primary Examiner*—Patrick P. Garvin
*Attorney, Agent, or Firm*—James S. Rose

[57] ABSTRACT

A novel catalyst combination for the trimerization of polyisocyanates to polyisocyanurates is disclosed. The catalyst combination comprises (i) a tertiary amine trimerization catalyst containing a dimethylamino moiety, (ii) an alkali metal salt of an N-(2-hydroxyphenyl)methyl glycine, and (iii) a monomeric epoxide. The use of these catalysts in the preparation of polyisocyanurate foams results in facile machine preparation of bun stock foam without incurring the processing problems that arise from the prior art method. The polyisocyanurate foams produced using the novel catalyst combination of the invention are characterized by a reduced level of smoke generated on combustion.

11 Claims, 2 Drawing Figures

PATENTED SEP 2 1975　　　　　　　　　　　　　　3,903,018

NOVEL COCATALYST SYSTEM FOR TRIMERIZING POLYISOCYANATES

BACKGROUND OF THE INVENTION

1. Field of the Invention

This invention relates to the preparation of polymer foams and is more particularly concerned with novel catalyst combinations for the trimerization of polyisocyanates to polyisocyanurates and their utilization in the preparation of polyisocyanurate foams.

2. Description of the Prior Art

Rigid polyisocyanurate foams having high resistance to flame and heat as well as excellent thermal insulating capacity are known in the art. The prior art discloses methods for preparing such foams by reacting an organic polyisocyanate with a trimerizing catalyst in the presence of a blowing agent, and a minor proportion (usually less than 0.5 equivalent per equivalent of polyisocyanate) of a polyol; see for example, U.S. Pat. Nos. 3,516,950, 3,580,868, 3,620,986, 3,625,872, and 3,725,319. The process described in U.S. Pat. No. 3,745,133 discloses the use of a combination of an epoxide and a tertiary amine as cocatalysts.

It will be recognized by one skilled in the art that the method referred to hereinabove requires the foaming process to proceed in conjunction with at least two polymer forming reactions; namely, the isocyanurate formation arising from the homopolymerization of the isocyanate employed, and the minor amount of polyurethane formation arising from the reaction of a polyol with the isocyanate. A drawback of the method is the variation in rate of the two polymerization reactions. The polyurethane formation initiates before the trimerization formation thus giving two separate rise steps in the overall foam rise profile.

When foams are prepared by high speed mixing machinery and dispensed on a conveyor line, the two-step rise profile causes "undercutting." The latter term is well recognized by those skilled in the foam art and refers to the movement of fresh, liquid reactant running under foam that is in the process of rising and has not itself reached a gel point. When this occurs, areas of unequal rising and gelling within a given location in a foam bun cause internal stresses which result in splits on the bun surface, or imperfections, either of which can render large sections of the bun useless and are economically unacceptable.

Additionally, a foam bun made by the method referred to hereinabove can be made to a maximum height of only 18 inches. It is well recognized by those skilled in the art that the larger the bun size prepared, the more favorable the economics of manufacture. In yet a further disadvantage arising from the two-step rise profile, the angle of the conveyor line to the horizontal must be greater than for a single rise profile, in order to partially accommodate the problems arising from the double rise. Increasing conveyor angles in foam bun line processing introduces additional difficulties ranging from greater space requirements for the machinery, to foam processing difficulties.

We have now found that it is possible to prepare polyisocyanurate foams by processes, in particular, by continuous bun stock operation, which do not have the disadvantages to be found in the prior art methods. Such foams can be processed on standard high speed mixing machines and dispensed on conveyor lines at normal angles. They can be easily formed to a 24 inch bun height and have an essentially single rise profile thereby eliminating the problem of undercutting. In addition, we have also found that the foams made in accordance with the present invention possess unexpectedly useful properties in that they generate as much as 55 percent less smoke during combustion tests than the closely related prior art foams made with previously known catalyst systems.

SUMMARY OF THE INVENTION

This invention comprises a cocatalyst system for the trimerization of a polyisocyanate which cocatalyst system comprises:

a. from about 10 to about 90 mole percent of a monomeric epoxide;

b. from about 5 to about 75 mole percent of a tertiary amine trimerization catalyst containing a dimethylamino group; and c. from about 5 to about 80 mole percent of a compound having the formula:

(I)

wherein M is an alkali metal, $R_1$ is selected from the class consisting of hydrogen and alkyl having from 1 to 12 carbon atoms, inclusive, $R_2$ is selected from the class consisting of hydrogen, alkyl having from 1 to 12 carbon atoms, inclusive, and —CH$_2$—COO$^\ominus$M$^\oplus$ and $R_3$ is selected from the class consisting of hydrogen and the group The term "alkyl having from 1 to 12 carbon atoms, inclusive" means methyl, ethyl, propyl, butyl, pentyl, hexyl, heptyl, octyl, nonyl, decyl, undecyl, dodecyl, and isomeric forms thereof. The term "alkali metal" means sodium, potassium, and lithium.

The invention also comprises an improved process for the preparation of a cellular polymer in which the major recurring polymer unit is isocyanurate which process comprises bringing together, in the presence of a blowing agent, a polyisocyanate, a minor amount of a polyol, and a cocatalyst system as recited hereinabove.

The invention also comprises the cellular polymers produced in accordance with the above process.

DETAILED DESCRIPTION OF THE INVENTION

The process of preparing flame and heat resistant polyisocyanurate cellular polymers is well-known in the art; see the references cited supra. A particularly useful class of such foams are those described at length in U.S. Pat. No. 3,745,133, the disclosure of which, in its entirety, is incorporated herein by reference.

This latter patent describes, inter alia, the use of a cocatalyst system comprising a particular group of epoxides, defined as monomeric polyfunctional epoxides having at least two epoxide groups, and a particular group of tertiary amines. We have now found that a cocatalyst of improved properties consists of a combination of (i) a monomeric epoxide, (ii) a selected group of the aforesaid tertiary amines, and (iii) a novel component, namely, a compound having the formula (I) above.

The polyisocyanurate cellular polymers of the type produced in accordance with U.S. Pat. No. 3,745,133 possess excellent fire and heat resistant properties and dimensional stability under adverse conditions. However, the polymers made in accordance with said patent suffer from the recalcitrant behavior of the foam reaction mixture during machine processing into foam bun stock. The primary reason lies in the difficulty of matching the rate of the slower reaction of polyisocyanate trimerization with the much faster reaction of the minor amount of polyol present with the polyisocyanate to form polyurethane.

Figure 1:
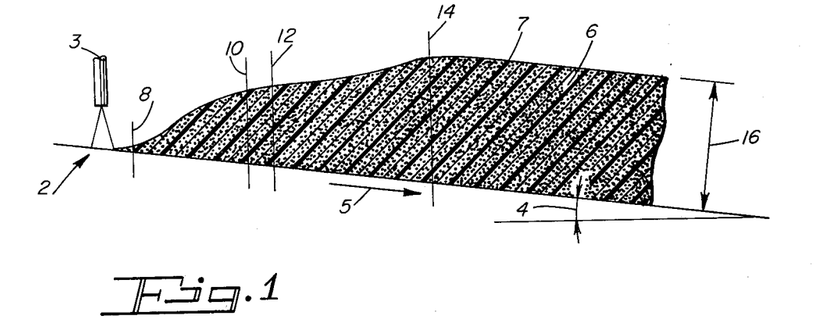
FIG. 1 is a cross-sectional view of the rise profile of a polyisocyanurate foam bun of the prior art.

In order to appreciate the problem more fully, FIG. 1 is shown as a cross-sectional view of a polyisocyanurate foam bun, made in accordance with U.S. Pat. No. 3,745,133, being formed on a moving conveyor line and showing a typical two-step rise profile. The conveyor line 2 is set at angle 4, is moving in direction 5, and has liquid foam reactants disposed 3 on the line. The foam cream time 8 is very rapid being typically four seconds and shows a first rise 10 at a typical time of one minute, followed by a gellation, this portion of the rise profile being due to the polyurethane formation. Then there follows the initiation of a second rise 12 at a time following the end of the first rise 10 due to the trimer reaction. The second rise is completed 14 usually in two to three minutes, and typically in about 2:20 to about 2:45 minutes, from the initial dispensing of the chemicals on the line. The bun 6 continues along the line with its skin covering 7 until maximum bun height 16 is reached.

Such a typical two-step rise profile gives rise to serious processing problems. The conveyor angle 4 is critical and must be as large as possible to assist in offsetting the effects of the two-step rise but not so steep as to cause liquid foam to run down the line. The most critical problem to arise from such a rise profile is the undercutting which can occur. This raises when liquid foam, or partially risen foam, flows under foam material in a more advanced state of rise. When this happens, there is a mixture of "younger" foam trapped under "older" foam and, in the ensuing expansion of the younger foam, internal stresses form which are eventually relieved by splitting along the upper surface of the bun, or by inhomogeneous cellular formation within the bun. Either one of the latter is enough to render useless a large section of the bun stock with the attendant economic loss. Even when the bun can be satisfactorily manufactured, the maximum bun height 16 obtainable is only 18 inches.

Figure 2:
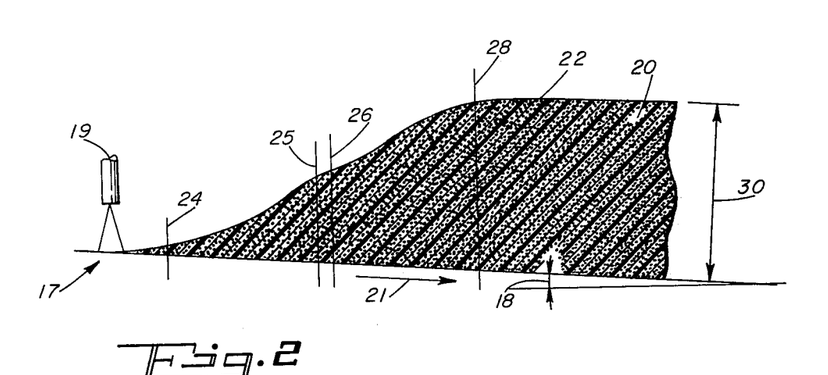
FIG. 2 is a cross-sectional view of the rise profile of a polyisocyanurate foam bun made in accordance with the present invention.

In contrast, FIG. 2 shows a typical cross-sectional view of the rise profile of a polyisocyanurate foam bun made in accordance with the present invention. The profile of FIG. 2 clearly shows a single rise as opposed to the two-step profile of FIG. 1. The conveyor line 17 is set at a smaller angle 18 to the horizontal than the angle 4 of FIG. 1. The line 17 is moving in the direction 21 and having reactants dispensed 19 thereupon. The cream time 24 is typically 19 seconds, while a gellation 26 occurs during the rise at a typical time of 1:40 minutes and culminates in an end of rise time 28 at a typical time of 2:40–3:15 minutes. At 25 is shown a slight hump in the rise profile which is so gradual that a first rise time (equivalent to 10 of FIG. 1) normally cannot be measured. The bun 20 moves down the conveyor line, covered by a skin 22 and reaching a maximum height 30. This single step rise profile obviates the disadvantages, described hereinabove and depicted in FIG. 1, and allows for higher resin throughout put per minute at 19 which in turn allows for greater bun height at the same density level.

The improvements illustrated by the rise profile in FIG. 2, which improvements lead to marked improvements in the properties of the resulting foam, are achieved by the use of a novel combination of catalysts set forth above. This cocatalyst combination will now be discussed in more detail.

The cocatalyst components are brought together during or immediately prior to the trimerization reaction of the polyisocyanate. In an optional step, the tertiary amine and the glycine salt (I) can be premixed or stored as a mixture in which case the epoxide component is kept separate until it is desired to carry out the trimerization process of the invention.

The components of the catalyst combination of the invention and the concentration ranges of said components are set forth hereinbelow in detail in the form of mole percentages. It is to be understood that the sum total of the individual mole percent concentrations chosen for each component must equal 100 mole percent. It is also to be understood that concentrations of one or more components can be varied within the specified ranges so long as the appropriate adjustments are made in one or more of the remaining components so that the total mole percent is 100. This method of indicating the proportions of the three components of the cocatalyst is adopted in defining the parameters of the cocatalyst itself. However, when particular embodiments of the use of the cocatalyst are described hereinbelow, e.g. in the preparation of a polyisocyanurate cellular polymer, the amounts of the components of the cocatalyst will be set forth in absolute terms.

1. The tertiary amine component of the cocatalyst system is advantageously employed in the combination in a proportion in the range of from about 0.5 mole percent to about 95 mole percent of said mixture and, preferably, in the range of from about 5 mole percent of 75 mole percent. The said tertiary amine component can be any of the tertiary amine trimerization catalysts known in the art provided that said tertiary amine contains at least one dimethylamino group. We have found that the presence of a dimethylamino group is highly desirable and is responsible in part for the excellent properties of the cocatalyst system. As will be seen from the data set forth in the specific Examples set forth below, the replacement of a tertiary amine meeting the above specifications by one which does not contain a dimethylamino group causes a marked and undesirable change in behavior of the system. However, tertiary amines which contain tertiary amino groups in addition to dimethylamino can be used provided that at least one dimethylamino group is present in the molecule of the tertiary amine. The following are examples of tertiary amine containing the dimethylamino moiety that can be used in the process of the invention but these examples are not to be construed as limiting: N,-N',N''-tris(dimethylaminopropyl)hexahydrotriazine, 2,4,6-tris(dimethylaminomethyl)phenol, o-dimethylaminomethylphenol, p-dimethylaminomethylphenol, N,N-dimethyl-N',N'-bis($\beta$-hydroxyethyl)propane diamine, N,N-dimethylethanolamine, N,N-dimethylbenzylamine. N,-N,N',N'-tetramethyl-1,3-butanediamine, N,N,N',N'-tetramethylpropanediamine, N,N-dimethylcyclohexylamine, N,N-dimethylaminopropylamine, 2,2'-bis(-dimethylamino)diethyl ether, and the like. A particularly preferred class of tertiary amines consist of the following: N,N-dimethylethanolamine, N,N-dimethylbenzylamine, N,N-dimethylcyclohexylamine, N,N,N',N'-tetramethyl-1,3-butanediamine, and N,N,N',N'-tetramethylpropanediamine.

2. The second component of the cocatalyst system, namely, the alkali metal salt of the N-(2-hydroxyphenyl)-methyl glycine of formula (I), is advantageously employed in a proportion in the range of from about 1 mole percent to about 95 mole percent of the cocatalyst and, preferably, in the range of from about 5 mole percent of 80 mole percent. The compounds of formula (I) are prepared by bringing together, under Mannich forming reaction conditions, for example, those taught in "Organic Reactions," Vol. I, p. 303, John Wiley and Sons, New York, 1942, the appropriate phenol of formula with formaldehyde, and the appropriate alkali metal glycine salt (II) of formula wherein $R_1$, $R_2$ and M have the significance defined above. The preparation of the compounds of formula (I) in which $R_3$ is hydrogen is illustrated by the following equation:

wherein $R_1$, $R_2$ and M have the significance above defined.

Typical examples of the starting phenol include: phenol, p-cresol, p-butyl phenol, p-heptyl phenol, p-octyl phenol, p-nonyl phenol, p-decyl phenol, p-dodecyl phenol. Typical examples of the glycine salt (II) include: sodium glycinate, potassium glycinate, lithium glycinate, sodium N-methyl glycinate, potassium N-methyl glycinate, sodium N-butyl glycinate, sodium N-octyl glycinate, sodium N-dodecyl glycinate, disodium iminodiacetate, and the like. The proportions of reactants employed in preparing the compound (I) include the molar ratio of phenol:formaldehyde:glycine derivative (II) from 1:1:1 to 1:2:2, and ratios therebetween.

In a preferred embodiment of the invention, the salt (I) is employed in the cocatalyst in combination with a diluent. Such diluents include low molecular weight polyols such as ethylene glycol, diethylene glycol, dipropylene glycol, dibutylene glycol, tetraethylene glycol, glycerol, the liquid polyethylene glycols such as the polyoxyethylene glycols prepared by the addition of ethylene oxide to water, ethylene glycol or diethylene glycol, and the like; Cellosolve, butyl Cellosolve, Carbitol, methyl Carbitol, butyl Carbitol, and the like; ethanolamine, diethanolamine, triethanolamine; and dipolar aprotic solvents such as dimethyl formamide, dimethyl acetamide, N-methylpyrrolidone, dimethyl sulfoxide, and the like; and mixtures of any of the aforesaid diluents. A particularly preferred class of solvents consists of ethylene glycol, diethylene glycol, polyethylene glycol 400, and mixtures thereof. The concentration of the glycine salt dissolved in the diluent is not critical and can vary from about 25 percent to about 75 percent by weight.

3. The third component of the cocatalyst system of the invention is an epoxide. This epoxide can be any of the mono- or poly-epoxides which have hitherto been found useful, in combination with amine catalysts, as trimerization catalysts for polyisocyanates. The term "polyepoxide" means a compound containing a plurality of epoxy groups and does not include polymers which have been obtained by polymerization of epoxide monomers partly or wholly via the epoxy groups. The term "monomeric epoxide" used herein is intended to encompass the above mono and polyepoxides and to exclude compounds obtained by polymerization of epoxide monomers.

Illustratively, the epoxide component of the cocatalyst system can be any one of the epoxide compounds set forth in U.S. Pat. No. 3,745,133, the disclosure of which has been incorporated herein by reference. The epoxides shown in the latter patent have at least two epoxy groups which are present in substituents attached to a cyclic hydrocarbon or are fused to non-aromatic rings in a cyclic hydrocarbon. A particularly preferred type are the glycidyl ethers of novolac resins described in Column 6, lines 12 - 41 therein, and represented by the general formula:

wherein $n$ has an average value of from about 0.2 to 12 and $R_4$ represents from 0 to 4 substituents selected from halogen and lower alkyl groups.

Illustrative of mono-epoxides which can be employed in the cocatalysts of the invention are butyl glycidyl ether, octyl glycidyl ether, phenyl glycidyl ether, and the like.

The epoxides are employed in the cocatalyst combination in a concentration of from about 2 mole percent to about 98 mole percent and preferably from about 10 mole percent to about 90 mole percent.

A particularly preferred cocatalyst combination is comprised of from about 35 to about 85 mole percent of a glycidyl ether of a novolac resin having a functionality of about two, from about 5 to about 35 mole percent of N,N-dimethylcyclohexylamine, and from about 10 to about 45 mole percent of sodium N-(2-hydroxy-5-nonylphenyl)methyl-N-methyl glycinate.

While the catalyst combination described hereinabove specifically requires the use of three different catalyst components in combination, it is to be understood that this does not exclude the presence in the catalyst combination of additional components or agents capable of causing the trimerization of a polyisocyanate provided the three components discussed above are present.

The polyols employed in preparing polyisocyanurate foams in accordance with the present invention can include any of the polyols set forth in U.S. Pat. No. 3,745,133, incorporated herein by reference or any of those known in the art to be useful as a minor component in the preparation of polyisocyanurate foams; see supra. Said polyols can be added separately during the trimerization of the polyisocyanate component, or can be prereacted with the polyisocyanate to form an isocyanate terminated prepolymer which is subsequently trimerized. The polyols are advantageously employed in the range from about 0.01 equivalent to about 0.3 equivalent per equivalent of isocyanate.

The polyisocyanates employed in the preparation of polyisocyanurate foams in accordance with the present invention can be any of the organic polyisocyanates conventionally employed in the art for this purpose previously; see the art cited supra. Advantageously, in order to obtain foams having exceptionally high heat resistance and structural strength, the polyisocyanates employed in the process of the invention are polymethylene polyphenyl polyisocyanates, particularly those set forth in U.S. Pat. No. 3,745,133. A particularly preferred form of polymethylene polyphenyl polyisocyanate is one having an acidity, expressed as "% hot HCl" of less than about 0.1 percent. Various methods of reducing the acidity to such levels are known in the art. A particularly useful process is that set forth in German OLS No. 2,249,375. The latter process comprises treating the polyisocyanate with from 0.25 to 1 equivalent of monomeric epoxide for each equivalent of acid present in the polyisocyanate.

In carrying out the preparation of polyisocyanurate foams in accordance with the process of the invention, the procedures and equipment conventional in the art are employed. The proportions of cocatalyst are so chosen that, for each equivalent of polyisocyanate present in the reaction mixture, there is employed from 0.001 to 0.02 equivalent, preferably from 0.003 to 0.01 equivalent, of said tertiary amine component, from 0.001 to 0.02 equivalent, preferably from 0.003 to 0.01 equivalent, of said compound (I), and from 0.01 to 0.06 equivalent, preferably from 0.02 to 0.05 equivalent, of said epoxide component.

Foaming agents, and other optical additives such as dispersing agents, cell stabilizers, surfactants, flame retardants, and the like, can be employed according to the teachings of the incorporated reference. A particularly preferred class of flame retardant additives are the phosphorus containing flame retardants, such as: tris(2-chloroethyl)phosphate, tris(2-chloropropyl)phosphate, tris(2,3-dibromopropyl)phosphate, tris(1,3-dichloroisopropyl)phosphate, and the like.

As set forth above, the use of the cocatalyst combination of the invention gives a superior reaction profile with consequent improvement in productivity and in physical properties of the resulting foam when applied to continuous bun stock production. In addition, it has been found, unexpectedly, that the foams produced in accordance with the invention not only retain the high resistance to flame and heat distortion, but also produce significantly less smoke under combustion.

Thus, the cellular products of the invention can be employed for all the purposes for which the currently produced cellular products are conventionally employed and are particularly suitable for applications where thermal resistance, low flame spread and low smoke generation on combustion are required. For example, the cellular products of the invention can be employed as thermal barriers and insulating materials for high temperature pipe lines and ovens, for insulative barriers for storage tanks containing materials at elevated temperatures; and are particularly useful in producing flame resistant laminate boards in the construction of industrial buildings.

The preparation of non-cellular polymers made in accordance with the present invention is carried out by using standard techniques known to those skilled in the art. Solid polymers are obtained by carrying out the invention in the absence of the blowing agent. The reactants can be cast, molded, coated, or otherwise deposited by methods known to those skilled in the art, to form a solid polyisocyanurate casting, molding, coating, or other form of solid polyisocyanurate. Such products find use for example, in high temperature resistant laminates prepared from reinforcing layers of heat resistant fabric such as glass fabric, graphite fabric, and the like, and layers of polyisocyanurate of the invention.

The following preparations and examples describe the manner and process of making and using the invention and set forth the best mode contemplated by the inventors of carrying out the invention but are not to be construed as limiting. The pertinent test procedures relating to the invention are defined as follows.

Acidity Determination

Two grams of the isocyanate to be analyzed is mixed with 75 ml. each of toluene and methanol in a 250 ml. Griffin beaker. The beaker is covered with a watch glass and the mixture refluxed for 5 minutes with stirring. The mixture is then allowed to cool to room temperature. Employing a Fisher Accumet pH meter with combination electrode, the mixture is titrated at a constant rate with 0.02 N potassium hydroxide in methanol to a pH of 7.7. A standard blank is prepared by carrying a mixture of 75 ml. each of toluene and methanol through the same procedure outlined above. The acid content of the isocyanate is then calculated according to the equation:

$$\% \text{ Acid} = (A - B) \times 0.0365$$

wherein $A$ is the number of milliters of potassium hydroxide solution used to titrate the isocyanate mixture and $B$ is the number of milliters of potassium hydroxide used to titrate the standard blank.

The number of equivalents of acid present in a given polyisocyanate are determined by the formula:

$$\text{Equivalents Acids} = \frac{(\% \text{ Acid}) (\text{Grams Isocyanate to be treated})}{36.5}$$

PREPARATION 1

Sodium N-(2-hydroxy-5-nonylphenyl)methyl-N-methyl glycinate

A 3 liter, 3-neck flask was fitted with a mechanical stirrer, nitrogen purge, thermometer, and take-off condenser with a receiver. The flask was charged with 385 g. of diethylene glycol, 410 g. (1.86 moles) of nonyl phenol, and 675 g. of an aqueous solution of sodium N-methyl glycinate which contained 32 percent by weight of the salt, or 216 g. (1.94 moles). During rapid stirring, the mixture was heated under atmospheric pressure, and at about 135°C, a major portion of the water was removed by distillation. The contents of the flask were cooled to about 90°C and 160 g. of 37% aqueous formaldehyde solution, equivalent to 59.2 g. (1.95 moles) of formaldehyde was added over a period of about 30 minutes. The flask contents were then heated to 110°–120°C and under atmospheric pressure most of the water was removed by distillation. Vacuum was slowly applied and at 95°–120°C and 3 mm. pressure, the remaining water and volatile materials were removed. About 255 g. of diethylene glycol was stirred into the viscous residue to provide sodium N-(2-hydroxy-5-nonylphenyl)methyl-N-methyl glycinate in quantitative yield as a 50 percent solution in diethylene glycol; hydroxyl E.W. = 90; viscosity, cstk. at 25°C = 13,048.

PREPARATION 2 – 13

Using the procedure of Preparation 1 and substituting the phenols, the amino acid salts and formaldehyde with the solvents as set forth in the following table, the corresponding glycine and iminodiacetate salts are obtained.

| Prep. | Phenol (1 mole) | Amino-acid (moles) | Formaldehyde (moles) | % Solvent | OH. E.W. | Product Visc., cstk. at 25°C |
|---|---|---|---|---|---|---|
| 2 | phenol | NaG[1] (1.0) | F (1.0) | 64[2] | 89 | 24,733 |
| 3 | phenol | NaG (1.9) | F (1.9) | 69[3] | 76 | 11,872 |
| 4 | phenol | NaS[4] (1.0) | F (1.0) | 62[2] | 101 | 27,735 |
| 5 | phenol | NaS (1.9) | F (1.9) | 67[2] | 124 | 22,265 |
| 6 | phenol | IDAK$_2$[5] (1.9) | F (1.9) | 65[3] | 77 | 627 (50°C) |
| 7 | nonyl phenol | NaG (1.0) | F (1.0) | 60[2] | 95 | 1,532 (50°C) |
| 8 | nonyl phenol | NaS (1.9) | F (1.9) | 55[3] | 99 | 16,737 |
| 9 | nonyl phenol | NaS (1.0) | F (1.0) | 44[6] | 246 | 6,280 (cps/27°C) |
| 10 | nonyl phenol | KG[7] (1.0) | F (1.0) | 55[2] | 96 | 21,903 |
| 11 | nonyl phenol | KS[8] (1.0) | F (1.0) | 55[2] | 120 | 1,030 (50°C) |
| 12 | nonyl phenol | IDAK$_2$ (1.0) | F (1.0) | 48[2] | 124 | 11,426 (50°C) |
| 13 | nonyl phenol | IDAK$_2$ (1.9) | F (1.9) | 63[2] | 115 | 24,471 |

Footnotes:
[1] Sodium glycinate
[2] 35% ethylene glycol solution in polyethylene glycol 400
[3] Diethylene glycol
[4] Sodium sarcosinate
[5] Dipotassium iminodiacetate
[6] Butyl Carbitol
[7] Potassium glycinate
[8] Potassium sarcosinate

PREPARATION 14

Using the apparatus and procedure of Preparation 1, 201 g. (1.86 moles) of p-cresol, along with 180 g. of diethylene glycol, and 675 g. of an aqueous solution of sodium N-methyl glycinate which contained 32 percent by weight of the salt, or 216 g. (1.94 moles), was stripped of the major portion of water. One hundred and sixty grams of 37% aqueous formaldehyde solution, equivalent to 59.2 g. (1.95 moles) of formaldehyde was added over a period of about 30 minutes. The reaction mixture was heated and vacuum distilled to remove volatiles according to the procedure of Preparation 1. About 250 g. of diethylene glycol was stirred into the viscous residue to provide sodium N-(2-hydroxy-5-methylphenyl)methyl-N-methyl glycinate in quantitative yield as a 50 percent solution in diethylene glycol; hydroxyl E.W. = 80.

EXAMPLE 1

The following high temperature resistant rigid foams set forth a comparison of the 300°F Dry Age properties of foams made in accordance with the invention with those of similar foams but lacking a dimethylamino grouping in the catalyst combination. The foams of the example were prepared either as hand-mix, or machine processed foams as indicated. The general procedure for hand mixing involved permixing the ingredients as three separate components by mechanical blending and then bringing the components together in a plastic 1 gallon tube with mechanical agitation. Then rapidly pouring the mixed components into a cardboard box measuring 7 inches × 7 inches × 11 inches to allow free foam rise. When the foams were prepared by machine processing, the components were mixed in a high shear mixing head and dispensed onto a conveyor line to produce a bun. Component A consisted of the polyisocyanate ingredient containing a surfactant, a blowing agent and Fyrol CEF; Component B the polyol portion containing a surfactant, a blowing agent, and the epoxide component of the catalyst combination; and Component C consisting of the tertiary amine and a glycinate salt as the other members of the catalyst combination. The resulting Foams A (hand mix) and B (machine processing) made in accordance with the invention are set forth in Table I along with Foam C (hand mix) which lacks the dimethylamino containing cocatalyst, and Foam D (hand mix) containing a diethylamino containing cocatalyst. Foams A and B are seen to have superior 300°F Dry Age stability in comparison to Foam C and Foam D which lacked proper foam firming characteristics. The organic polyisocyanate employed in the preparation of Foam B was prepared by treating polymethylene polyphenyl isocyanate containing about 40 percent by weight of methylenebis(phenyl isocyanate) with a minor amount of monomeric epoxide in accordance with the method taught in copending U.S. application Ser. No. 190,379 filed Oct. 18, 1971 now U.S. Pat. No. 3,793,362 for reducing acidity. The resultant polyisocyanate had an isocyanate equivalent of about 141 and 0.07 percent acidity.

TABLE I

| Foams | A | B | C | D |
|---|---|---|---|---|
| Ingredients: | | | | |
| Component A: | | | | |
| Polyisocyanate | | 134 | | |
| Isonate-580 [1] | 134 | | 134 | |
| PAPI-18 [2] | | | | 134 |
| L-5340 [3] | 1 | 1 | 1 | 1 |
| Fyrol CEF [4] | 15 | 15 | 15 | 15 |
| Freon 11-B | 20 | 16 | 20 | 20 |
| Component B: | | | | |
| Polyester [5] | 35 | 35 | 35 | 35 |
| DEN-431 [6] | 8 | 8 | 8 | 8 |
| DC-193 [7] | 1 | 1 | 1 | 1 |
| Freon 11-B | 10 | 10 | 10 | 9 |
| Component C: | | | | |
| Catalyst A [8] | 4.5 | | | |
| Catalyst B [9] | | 3.5 | | |
| Catalyst C [10] | | | 10.5 | |
| Catalyst D [11] | | | | 11.5 |
| Foam Physical Properties: | | | | |
| Density, p.c.f. | 2.00 | 2.02 | 2.22 | |
| Rise characteristics | GOOD NO SHRINKAGE | GOOD NO SHRINKAGE | SOME SHRINKAGE | IMPROPER FOAM FIRMING |
| 300°F Dry Age | | | | |
| Avg. Δ Z (%) | −0.55 | 1.9 | 17.0 | |
| Avg. Δ X (%) | 1.6 | 2.6 | 17.3 | |
| Avg. Δ Y (%) | −2.1 | −2.1 | −1.25 | |

Footnotes:

[1] Isonate-580 is polymethylene polyphenyl isocyanate having a viscosity of about 650 cps. at 25°C; isocyanate equivalent 140.

[2] PAPI-18 is a polymethylene polyphenyl isocyanate having a viscosity of about 1,500 cps. at 25°C; isocyanate equivalent 140.

[3] L-5340 Union Carbide Silicone Surfactant For Rigid Urethane Foam, see Bulletin F-42172A, October, 1970, viscosity of 1,000 cstk. at 25°C.

[4] Fyrol CEF: tris(betachloroethyl)phosphate, see Stauffer Production Data Sheet entitled Fyrol CEF, June 15, 1967.

[5] The polyester used in this example was 24.8 parts of the product of esterifying 1 mole of chlorendic anhydride with 1.1 moles of diethylene glycol and 2.5 moles of propylene oxide, blended with 8 parts of a polyol formed by the reaction of 3 moles of ethylene oxide with trimethylolpropane having an equivalent weight of about 93 and 2.2 parts of diethylene glycol.

[6] DEN-431: Dow epoxy novolac resin, viscosity of 76,500 cps. at 25°C, see "D.E.N. Epoxy Novolac Resins", The Dow Chemical Company, 1967, pgs. 1 – 2.

[7] DC-193: Dow Corning Surfactant, see Bulletin 05-146, February, 1966.

[8] Catalyst A: A mixture of 3 parts of a 50 percent solution of sodium N-(2-hydroxy-5-nonylphenyl)methyl-N-methyl glycinate in diethylene glycol with one part of tetramethyl-propanediamine.

[9] Catalyst B: A mixture of 9 parts of a 50 percent solution of sodium N-(2-hydroxy-5-nonylphenyl)methyl-N-methyl glycinate in diethylene glycol with 2 parts of dimethyl cyclohexylamine.

[10] Catalyst C: A 50 percent solution of sodium N-(2-hydroxy-5-nonylphenyl)methyl-N-methyl glycinate in diethylene glycol.

[11] Catalyst D: 10.5 parts of Catalyst C mixed with 1.0 part of diethylcyclohexylamine.

EXAMPLE 2

Two high temperature resistant rigid foams were prepared using the hand mix procedure set forth in Example 1 and employing the same polyester component. The reactants are set forth in Table II. Foam E employed a polyisocyanate treated in accordance with the method as set forth for Foam B of Example 1 and had an acidity content of 0.07 percent, while Foam F employed a similar polymethylene polyphenyl isocyanate except it receives no epoxide treatment and had an acidity content of 0.13 percent. The time-rise data shows the higher catalyst concentration required in Foam F in order to maintain the same rise profile.

TABLE II

| Foams | E | F |
|---|---|---|
| Ingredients: | | |
| Component A: | | |
| Polyisocyanate (0.07% acidity) | 134 | |
| Polyisocyanate (0.13% acidity) | | 134 |
| L-5340 | 1 | 1 |
| Fyrol CEF | 15 | 15 |
| Freon 11-B | 20 | 20 |
| Component B: | | |
| Polyester | 35 | 35 |

TABLE II-Continued

| Foams | E | F |
|---|---|---|
| DEN-431 | 8 | 8 |
| DC-193 | 1 | 1 |
| Freon 11-B | 10 | 10 |
| Component C: | | |
| Catalyst E [1] | 6 | 8 |
| Cream (sec.) | :13 | :13 |
| Initiation (sec.) | :15 | :15 |
| Gel (min:sec.) | 1:05 | 1:07 |
| Rise (min:sec.) | 1:45 | 1:50 |
| Tack free (min:sec.) | 2:45 | 2:45 |
| Firm | 5:00– 6:00 | 5:00 6:00 |

Footnote:
[1] Catalyst E: A mixture of 9 parts of a 50 percent solution of sodium N-(2-hydroxy-5-nonylphenyl)methyl-N-methyl glycinate in diethylene glycol with 2 parts of diethylene glycol and 1 part of tetramethylbutanediamine.

EXAMPLE 3

Two high temperature resistant rigid foams were prepared using the hand mix procedure and ingredients as set forth in Foam B of Example 1 except that one (Foam H) was prepared without the epoxide (DEN-431) constituent of the catalyst combination. The foams are set forth in Table III and Foam H shrinks whereas Foam G does not.

TABLE III

| Foams | G | H |
|---|---|---|
| Ingredients: | | |
| Component A: | | |
| Polyisocyanate | 134 | 134 |
| L-5340 | 1 | 1 |
| Fyrol CEF | 15 | 15 |
| Freon 11-B | 16 | 16 |
| Component B: | | |
| Polyester | 35 | 35 |
| DEN-431 | 8 | |
| DC-193 | 1 | 1 |
| Freon 11-B | 10 | 9 |
| Component C: | | |
| Catalyst B | 3.5 | 3.5 |
| Cream | :13 | :13 |
| Initiation 1 | :16 | :15 |
| Rise 1 | :50 | :50 |
| Initiation 2 | 1:05 | 1:00 |
| Gel | 1:16 | 1:05 |
| Rise 2 | 1:50 | 1:40 |
| Tack Free | 3:15 | 3:00 |
| Firm | 6:00– 7:00 | 8:00– 9:00 |
| | No foam shrinkage | Foam shrinks |

EXAMPLE 4

Foam formulations made in accordance with the hand mix technique and ingredients set forth in Foam B of Example 1, were used to determine the cocatalyst activity of a number of different amines in combination with the other two cocatalysts of the invention. The N,N-dimethylcyclohexylamine was replaced by the amines shown in Table IV. Activity was measured by determining the conversion of polyisocyanate to polyisocyanurate as a percent of the total possible 1,3,-5-triketohexahydrotriazine (trimer) attainable in the cellular foams as measured by a standard infrared absorption technique based on the absorption of this grouping at 1410 cm.$^{-1}$. The amine activity is expressed by the percent conversion to the trimer moiety in the respective foams. The model formulation consisted of the following ingredients:

Component A — 134 parts of Polyisocyanate, 15 parts of Fyrol CEF, 1 part of L-5340 and 15 parts of Freon 11-B.

Component B — 35 parts of Polyester, 8 parts of DEN-431, 1 part DC-193, and 15 parts of Freon 11-B.

Component C — 3.8 parts of a 50 percent solution of sodium N-(2-hydroxy-5-nonylphenyl)methyl-N-methyl glycinate in diethylene glycol blended with 0.0046 equivalent based on 0.59 parts of N,N-dimethylcyclohexylamine of the amines listed in Table IV. The minimum acceptable conversion for proper foam rise conditions is of the order of 55 percent and dimethylcyclohexylamine shows the highest conversion of 70.6 percent.

TABLE IV

| Amine | % Trimer Formation |
|---|---|
| Nicotinamide | 0 |
| BF$_3$ Ethylamine | 24.6 |
| N,N-Diethylcyclohexylamine | 29.3 |
| N-Methyldiethanolamine | 35.3 |
| Triethanolamine | 46.0 |
| Alpha picoline | 50.6 |
| 2-Benzylpyridine | 51.2 |
| N-Ethylmorpholine | 52.6 |
| N-Methylmorpholine | 54.0 |
| 2,4,6-Tris(dimethylaminomethyl)phenol | 56.6 |
| o-Dimethylaminomethyl phenol | 58.7 |
| N,N-Dimethyl-N'-N'-bis($\beta$-hydroxyethyl)-propane diamine | 58.7 |
| N,N-Dimethylethanolamine | 60.6 |
| Tetramethyl quanidine * | 62.0 |
| N,N-Dimethylbenzylamine | 66.0 |
| N,N,N',N'-Tetramethyl-1,3-butanediamine | 66.6 |
| N,N,N',N'-Tetramethylpropanediamine | 67.3 |
| Triethylenediamine * | 68.0 |
| N,N-Dimethylcyclohexylamine | 70.6 |

*Although high trimer conversion, foam is poor and shrinks.

EXAMPLE 5

Foams I, J, K, and L of this Example (Table V) set forth the effects on the rise characteristics of foams when a component of the preferred catalyst combination is deleted or high acidity polyisocyanate is employed. All the foams are machine formulations except Foam I, and in each case the catalyst concentrations were employed so as to obtain the optimum rise characteristics available with that particular formulation. Foam I was prepared with N,N-dimethylcyclohexylamine and the epoxide as the catalyst components. Foam rise was slow. Foam J contained the glycineamine catalyst mixture but lacked the epoxide. This caused an 18 inch high foam bun to shrink 5 inches. Foam K contained the glycine and epoxide components but lacked the amine, and the polyisocyanate was not treated with epoxide to lower its acidity level which resulted in foam shrinkage. Foam L, made in accordance with the invention, resulted in a perfect rise profile as exemplified in FIG. 2.

TABLE V

| Foams | I | J | K | L |
|---|---|---|---|---|
| Ingredients: | | | | |
| Component A: | | | | |
| Polyisocyanate | 134 | 134 | | 134 |
| PAPI - 18 | | | 134 | |

TABLE V-Continued

| Foams | I | J | K | L |
|---|---|---|---|---|
| Fyrol CEF | 15 | 15 | 15 | 15 |
| L-5340 | 1 | 1 | 1 | 1 |
| Freon 11-B | 16 | | | |
| Component B: | | | | |
| Polyester | 35 | 35 | 35 | |
| Polyester A [1] | | | | 43 |
| DEN-431 | 8 | | 8 | 6 |
| DC-193 | 1 | 1 | 1 | 1 |
| Freon 11-B | 10 | 24 | 24 | 26 |
| Component C: | | | | |
| N,N-Dimethylcyclo-hexylamine | 6 | | | |
| Catalyst B | | 3.2 | | |
| Catalyst E[2] | | | 10.5 | |
| Catalyst F[3] | | | | 6 |
| Cream | instant | :22 | :22 | |
| Initiation | very rapid | :24 | :24 | |
| Rise 1 | 0:30 | | | |
| Initiation 2 | 3:30 | | | |
| Gel | 3:30 | 1:45 | 1:45 | |
| Rise | 6:00 | 2:30 | 2:30 | |
| Firm | 8:00–9:00 | | | |
| | Foam Rise Too Slow | 18″ Bun Shrinks 5″ | Foam Shrinks | Perfect Rise Profile |

Footnotes:
[1] Polyester A: The polyester obtained by esterifying 1 mole of chlorendic anhydride with 1.1 moles of diethylene glycol and 2.5 moles of propylene oxide.
[2] Catalyst E: A blend of 7.875 parts of a 50 percent solution of sodium N-(2-hydroxy-5-nonylphenyl)methyl-N-methyl glycinate in diethylene glycol and 2.625 parts of diethylene glycol.
[3] Catalyst F: A blend of 9 parts of a 50 percent solution of sodium N-(2-hydroxy-5-nonylphenyl)methyl-N-methyl glycinate in diethylene glycol with 1 part of dimethylcyclohexylamine and 1 part of diethylene glycol.

EXAMPLE 6

Foams M and N of this Example are two machine processed high temperature resistant rigid foam formulations which set forth a comparison of the properties in an embodiment of the present invention (Foam M) over an embodiment of the prior art (Foam N) also containing predominantly polyisocyanurate linkages. Foam N can only be made at a maximum foam bun height of 18 inches and shows two distinct steps in its rise profile as shown in FIG. 1. The stepwise rise profile tends to cause foam undercutting and bun splits. Foam M on the other hand possesses a continuous rise as shown in FIG. 2 which prevents undercutting and is easily prepared in 24 inch bun height. Both foams have the same Flame Spread Rating of 25 as determined in accordance with ASTM E-84. Foam M has a much lower smoke generation than Foam N as determined during the same ASTM E-84 test.

TABLE VI

| Foams | M | N |
|---|---|---|
| Ingredients: | | |
| Component A: | | |
| Polyisocyanate | 134 | |
| Polyisocyanate [1] | | 134 |
| L-5340 | 1 | |
| L-5420 | | 2 |
| Fyrol CEF | 8 | |
| Component B: | | |
| Polyester A | 43 | |
| DC-193 | 1 | |
| DEN-431 | 6 | 2 |
| Freon 11-B | 26 | 26 |
| Hetrofoam-320 [2] | | 30 |
| DER-542 [3] | | 14 |
| Component C: | | |
| DMP-10 [4] | | 6 |
| Catalyst F | 6 | |

TABLE VI-Continued

| Foams | M | N |
|---|---|---|
| Cream | :19 | :04 |
| Initiation | :22 | :06 |
| Gel | 1:40–2:10 | |
| Rise 1 | | 1:00 |
| Initiation 2 and Gel | | 1:15 |
| Final Rise | 2:40–3:30 | 1:20–2:45 |
| Tack Free | 2:40–3:15 | |
| Bun Height, inches | 24 | 18 |
| ASTM E-84 Test: | | |
| Flame Spread Rating (FSR) | 25 | 25 |
| Smoke generated from 1″ slab | 70 | 160 |
| Rise Profile | FIG. 2 No Foam Undercutting | FIG. 1 Undercutting causing bun split due to 2 rises |

Footnotes:
[1] Polyisocyanate: prepared by heating polymethylene-polyphenyl isocyanate, containing about 50 percent by weight of methylenebis(phenyl isocyanate) and having a viscosity at 25°C of 250 cps., at about 235°C until the viscosity (at 25°C) was 1000 cps.
[2] Hetrofoam 320: a rigid urethane foam polyester polyol based on chlorendic acid, hydroxyl number = 320. See "Hetrofoam 320 and Polyphenylisocyanates in Fire Retardant Rigid Urethane Foams," Hooker Corporation Service Bulletin No. 3013, October, 1963.
[3] DER-542, the condensation product of tetrabromobisphenol A and epichlorohydrin, percent bromine content = 44–48%, epoxy equivalent weight 350–400, Dow Chemical Company Bulletin 170-145-3M-764.
[4] DMP-10, mixture of ortho- and para-dimethylamino-methylphenol, Rohm and Haas Company Bulletin SP-62, February, 1963.

We claim:

1. In a cocatalyst system for the trimerization of a polyisocyanate which consists essentially of a mixture of a monomeric epoxide and a tertiary amine trimerization catalyst containing a dimethylamino group, the improvement wherein said mixture contains (a) from about 5 to about 80 mole percent of a glycine salt having the formula:

wherein M is an alkali metal, $R_1$ is selected from the class consisting of hydrogen and alkyl having from 1 to 12 carbon atoms, inclusive, $R_2$ is selected from the class consisting of hydrogen, alkyl having from 1 to 12 carbon atoms, inclusive, and $-CH_2-COO^- M^+$, and $R_3$ is selected from the class consisting of hydrogen and the group (b) from about 10 to about 90 mole percent of said monomeric epoxide, and (c) from about 5 to about 75 mole percent of said tertiary amine trimerization catalyst.

2. A cocatalyst according to claim 1 wherein the epoxide ingredient is a glycidyl ether of a novolac resin having a functionality of at least two.

3. A cocatalyst according to claim 1 wherein the tertiary amine is N,N-dimethylcyclohexylamine.

4. A cocatalyst according to claim 1 wherein the glycine salt is sodium N-(2-hydroxy-5-nonylphenyl)methyl-N-methyl glycinate.

5. A cocatalyst according to claim 1 wherein the glycine salt is present in the form of a solution containing from about 25 percent to about 75 percent in a diluent.

6. A cocatalyst system for the trimerization of a polyisocyanate consisting essentially of:
   a. from about 10 to about 90 mole percent of a glycidyl ether of a novolac resin having a functionality of at least two;
   b. from about 5 to about 75 mole percent of N,N-dimethylcyclohexylamine; and
   c. from about 5 to about 80 mole percent of sodium N-(2-hydroxy-5-nonylphenyl)methyl-N-methyl glycinate.

7. A cocatalyst according to claim 6 wherein said glycinate is present in the form of a solution containing from about 25 percent to about 75 percent in a diluent.

8. A cocatalyst according to claim 7 wherein said diluent is diethylene glycol.

9. A cocatalyst system for the trimerization of a polyisocyanate according to claim 6 consisting essentially of:
   a. from about 35 to about 85 mole percent of a glycidyl ether of a novolac resin having a functionality of about two;
   b. from about 5 to about 35 mole percent of N,N-dimethylcyclohexylamine; and
   c. from about 10 to about 45 mole percent of sodium N-(2-hydroxy-5-nonylphenyl)methyl-N-methyl glycinate.

10. A cocatalyst according to claim 9 wherein said glycinate is present in the form of a solution containing from about 25 percent to about 75 percent in a diluent.

11. A cocatalyst according to claim 10 wherein said diluent is diethylene glycol.

* * * * *